United States Patent
Coast et al.

[15] 3,656,566
[45] Apr. 18, 1972

[54] GAS COOLED NUCLEAR REACTOR INSTALLATION

[72] Inventors: Geoffrey Coast, Northwich; Vernon Morgan, Culcheth, near Warrington, both of England

[73] Assignee: United Kingdom Atomic Energy Authority, London, England

[22] Filed: Oct. 3, 1968

[21] Appl. No.: 764,707

[30] Foreign Application Priority Data

Oct. 27, 1967 Great Britain..................49,056/67

[52] U.S. Cl..............................................176/59, 176/60
[51] Int. Cl. ......................................................G21d 5/00
[58] Field of Search.................................176/60, 59

[56] References Cited

UNITED STATES PATENTS

| | | | |
|---|---|---|---|
| 3,377,800 | 4/1968 | Spillmann | 176/60 |
| 3,410,091 | 11/1968 | Frutschi | 176/60 |
| 3,444,038 | 5/1969 | Schabert | 176/60 |

*Primary Examiner*—Reuben Epstein
*Attorney*—Larson, Taylor and Hinds

[57] ABSTRACT

In a gas cooled nuclear reactor, especially one wherein the coolant is compressed, heated, and expanded through a heat utilisation plant, prior to entry to the nuclear reactor, that is one wherein the reactor is used for reheat, the moderator is cooled by a bleed by passing part of the compressor. The moderator coolant ducts are preferably convergent step wise in the direction of coolant flow through them.

4 Claims, 5 Drawing Figures

3,656,566

GAS COOLED NUCLEAR REACTOR INSTALLATION

RELATED CASES

U.S. Pat. application Ser. No. 722,929, filed Apr. 22, 1968.
U.S. Pat. application Ser. No. 685,874, filed Nov. 27, 1967.

The present invention concerns a gas cooled nuclear reactor station and is especially concerned with a gas-cooled graphite moderated nuclear reactor station wherein the gaseous coolant leaving the reactor core is passed through a gas turbine to a regenerative heat exchanger wherein it gives up most of its residual heat to coolant returning to the reactor core at boosted pressure, after which the returning coolant is then reduced by a further gas turbine before the said returning gaseous coolant re-enters the reactor core.

Unfortunately the outlet temperature of the further gas turbine, if the cycle is to be efficient, is higher than that desirable for the reactor core to operate at continuously. Whilst the outlet temperature can be reduced, it can only be reduced at a heavy price in the efficiency of the cycle. The critical parts of the reactor core are the graphite blocks that form the moderator and reflector structure which are normally cooled by a fraction of the coolant separated from the main stream on entry to the reactor core.

According to the present invention, in a closed coolant circuit of a gas cooled nuclear reactor installation comprising a reactor core, a heat utilisation plant, a multi-stage compressor for circulating coolant through said circuit and a coolant feed heater, there is a bleed duct by-passing the feed heater to lead some of the coolant at a relatively low temperature to cool moderator components of the core.

Nuclear reactor fuel elements are capable of prolonged operation at high temperatures and as far as the fuel elements are concerned there is no objection to the coolant entering the core at temperatures of 400°–500° C and at a pressure of say 1030 pounds per square inch. This applies even to graphite sleeves round the fuel elements as these are replaced periodically (when the fuel charge is changed). However permanent graphite structure would deteriorate under such conditions and should be kept at a temperature of about 340° C. Thus coolant at a lower temperature is preferably used in a graphite moderated reactor to cool the graphite moderating core structure. It can also be used to cool the nuclear reactor pressure vessel wall and diaphragms extending across the pressure vessel where they exist as in the later versions of the British AGR. In this way savings can be made in the cost of thermal insulation.

The invention is especially applicable to reactor installations as described in British Pat. No. 1,058,518 and U.S. Pat. application Ser. No. 722,929, filed on Apr. 22, 1968 where $CO_2$ is compressed by a multi-stage compressor to say 2200 pounds per square inch within a temperature range of between say 20°–100° C at which temperature range the necessary power is comparatively small and then preheated and then expanded through a gas turbine. The bleed duct can tap off from an intermediate point in the compressor at a temperature of say 59° C and a pressure of say 1040 pounds per square inch. It has been calculated that an 8½% bleed would be sufficient in one design to maintain the permanent graphite moderating core structure at the desired temperature. It is desirable to use as small a percentage as possible as this enables the feed heater to be made smaller than with a larger percentage. To avoid over-cooling of the graphite where the very cool coolant enters the moderating core structure, the coolant channels through the moderating core structure should converge in the direction of flow, possibly in a stepwise manner. This convergence results in poorer heat transfer where the coolant channels are larger.

An embodiment of the invention will now be described by way of example with reference to the accompanying drawings.

BRIEF DESCRIPTION OF THE DRAWINGS

FIG. 3 shows an alternative feature of the arrangement shown in FIG. 1

Figure 1:
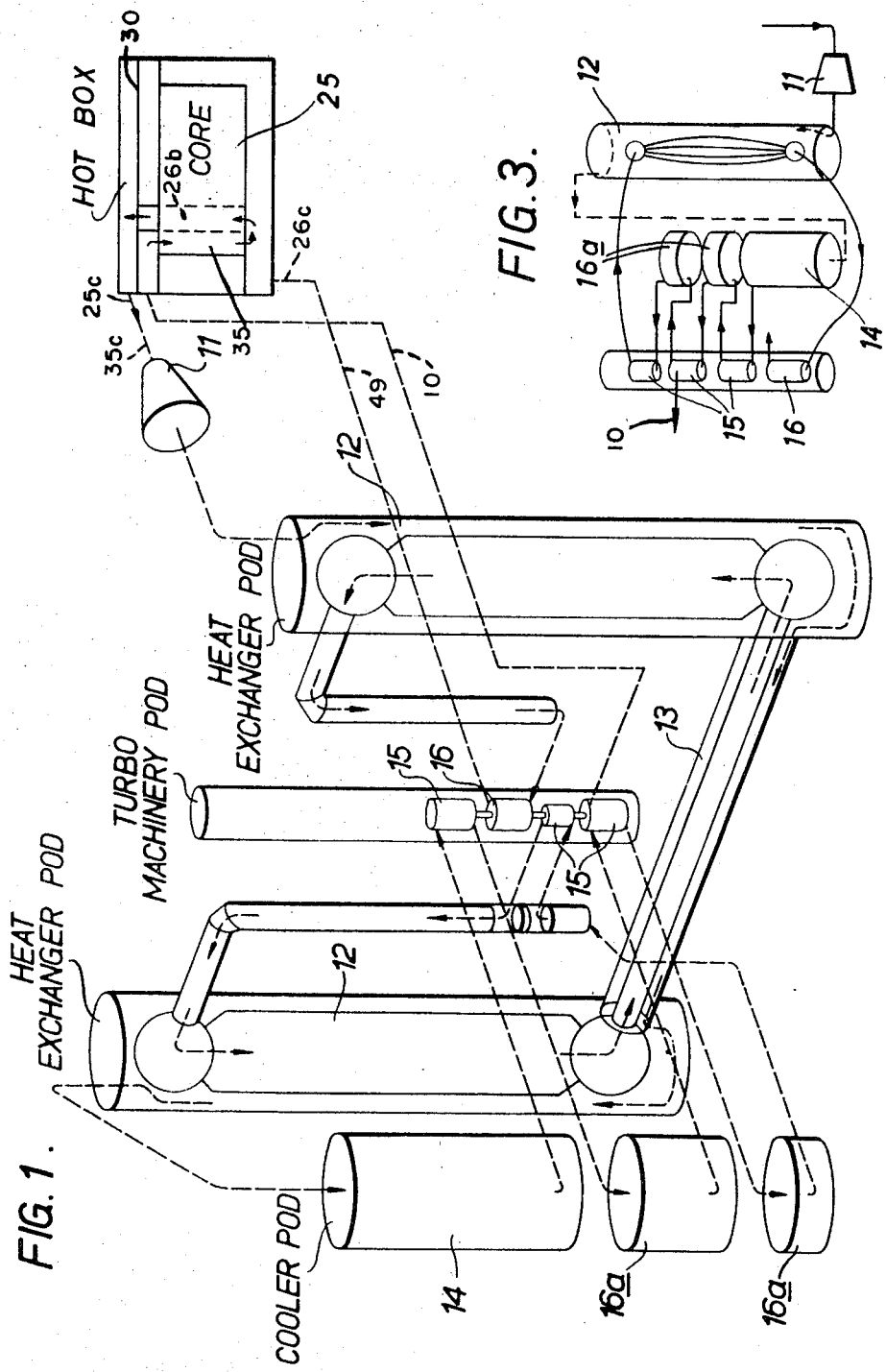
FIG. 1 is a schematic arrangement of a gas cooled reactor coolant circuit

DETAILED DESCRIPTION OF THE PREFERRED EMBODIMENTS:

Referring to FIG. 1 and FIG. 3, carbon dioxide is used in a closed circuit as coolant gas for a graphite moderated nuclear reactor core. The gas leaves the reactor core 25 by way of a port 25c at a pressure of 1005 pounds per square inch, a temperature of 700° C and a density of 2.3 pounds per cubic foot, and is passed through a first turbine stage 11, by which electrical power is produced. On exhausting from the turbine stage 11 at a pressure of 405 pounds per square inch, the coolant gas has its temperature reduced from 585° C to 120° C in a feed heater 12 which is made in two parts joined by a concentric duct 13. The coolant is cooled further to 25° C in a pre-cooler 14 and then undergoes compression in a three stage compressor 15 which cooperates with interstage coolers 16a to provide a first fraction of coolant leaving the compressor at a pressure of 2200 pounds per square inch and a temperature of 95° C to flow to the feed heater 12. The temperature of the first fraction is increased to 495° C in the feed heater 12 and the pressure is then reduced to 1030 pounds per square inch in a turbine 16 used to drive the compressor 15. The first fraction is then returned to the nuclear reactor core to have its store of heat replenished prior to repeating the cycle. The core at present envisaged is of the type known as the British Advanced Gas-Cooled reactor wherein there is a moderating core structure which is kept relatively cool.

A second fraction of coolant, hereinafter termed re-entrant moderator coolant is taken from the output of one of the compressor stages at a pressure of say 1,100 pounds per square inch and a temperature of about 60° C by means of a duct 10 and, by-passing the feed heater 12, is directed to the reactor to cool the moderating core structure.

The moderating core structure comprises a plurality of columns of stacked graphite blocks which define vertical passageways for moderator cooling channels and fuel element channels. In FIG. 1, the moderator coolant flow channels are designated 35 and the fuel element channels are designated 26b. A first inlet port connected to the moderator cooling channels is designated 35c. Moderator coolant flows downwardly through the passages 35 and rejoins the main stream of the coolant at the bottom of the core, the coolant then flowing up the fuel element channels 26b.

Due to the size of the feed heater, this may have to be sub-divided into six parts to enable it to be incorporated within cavities in the wall of a concrete pressure vessel 19 (FIG. 5) housing the reactor core and it appears best to sub-divide the coolant circuit into three parallel sub circuits substantially as described with reference to FIG. 1. However, it may be possible to use a feed heater divided into only three parts in which event the sub circuit shown in FIG. 3 can be used.

Figure 2:
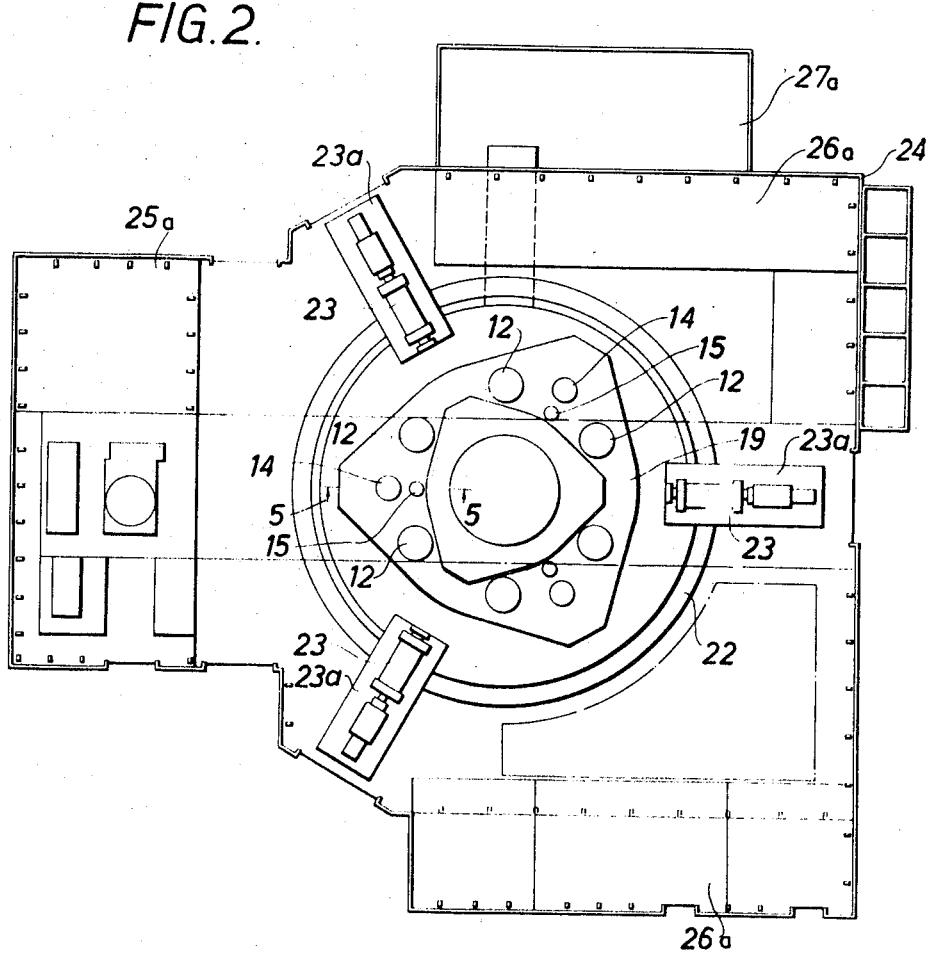
FIG. 2 is a plan view on a nuclear reactor installation
Figure 5:
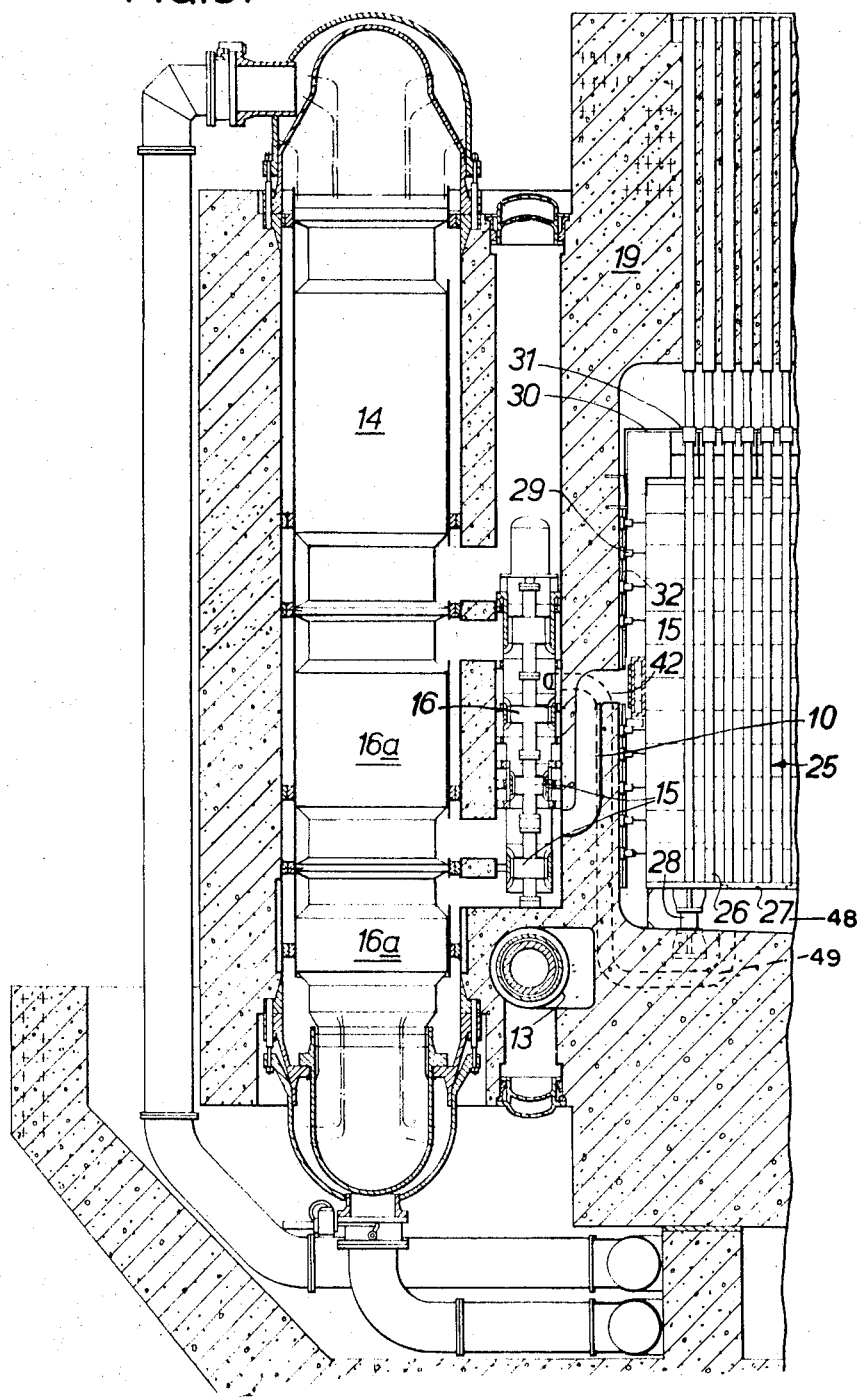
FIG. 5 is a partial section in elevation through the nuclear reactor station along 5—5 of FIG. 2.

Referring now to FIGS. 2 and 5, the reactor installation is built on a monolithic concrete raft 22 having three station output generators 23 on platforms 23a about its periphery. On this raft rests, as shown in FIG. 2, the concrete pressure vessel 19. This vessel is lobed with one of the three parallel sub circuits associated with a corresponding lobe.

This raft is housed inside a building 24 which provides the usual reactor facilities such as a fuel handling area 25a, a services block 26a, and electrical transformer compound 27a.

Figure 4:
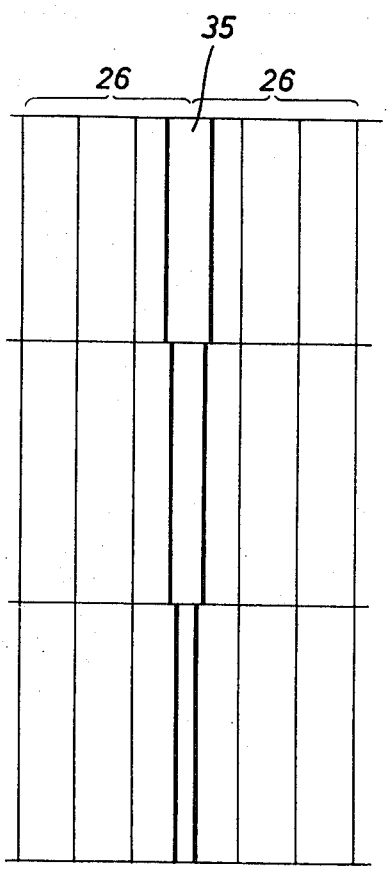
FIG. 4 is an illustration of a re-entrant coolant passage in a moderating core structure of a reactor.

FIG. 5 is a section through the wall of the pressure vessel showing part of the core of the reactor. The inside or vault of the pressure vessel and the core are very similar to that described in U.S. Pat. application Ser. No. 685,874 filed on Nov. 27, 1967. A moderating core structure 25 is supported in columns 26 of block like components on a layer 27 of plates which rest on pillars 28. The core is constrained against outward movement by restraints 29 on the vessel. A steel diaphragm 30 separating the coolant inlet and coolant outlet above the core proper carries laterally resilient devices 31. The return flow of coolant gas from the compressor 16 to the reactor core enters a plenum 48 (FIG. 5) by way of a duct 49. The moderator coolant fraction from the compressor 15 returns by way of duct 10 to the vault housing the core, expands over the peripheral surfaces of the core, flows to beneath the diaphragm 30, thence downwardly through the channels 35 to the plenum 48 where it reunites with the main flow of reactor coolant. The reactor coolant then flows upwardly in heat exchange with the fuel through channel extensions which penetrate the diaphragm 30 and which open into the coolant outlet from the reactor. The main differences from the structure described in U.S. application Ser. No. 685,874 are; that better thermal insulation is provided for the walls of the pressure vessel in the form of packs of 0.004 inch thick stainless steel foil (not shown) in addition to neutron shielding 32, that no orifice plate is required, and that coolant passageways 35 (FIG. 4) in the columns 26 of the moderating core structure are stepped to reduce the extent of moderator cooling by the incoming relatively cold re-entrant moderator coolant. Thus the passageways are larger at the top and smaller at the bottom, the passageways are thus convergent in the direction of coolant flow. This convergence need not be step wise, however could be continuous but step wise convergence promotes turbulence which is desirable at least at the bottom ends of the passageways.

We claim:

1. A gas cooled nuclear reactor installation comprising a closed coolant circuit having a plant for utilizing heat energy, a reactor core having a solid moderator with fuel element channels containing fuel elements and moderator cooling channels, a first coolant inlet port connected to said fuel element channels and a second coolant inlet port connected to said moderator cooling channels, and an outlet port common to all of the channels, said reactor being included in said closed coolant circuit, such that the plant utilizes heat energy derived from said core, a multi-stage compressor arranged to circulate coolant through said circuit, a feed heater arranged to heat a first fraction of coolant flowing from said compressor to said first coolant-inlet port of the reactor, and a duct means for directing a second fraction of coolant flowing from said compressor to said second coolant port of the reactor, said duct by-passing the feed heater.

2. A gas cooled nuclear reactor installation according to claim 1 wherein said heat energy utilizing plant comprises at least one gas turbine.

3. A gas cooled nuclear reactor installation according to claim 2, wherein the coolant outlet ends of the moderator cooling channels are connected to the coolant inlet ends of the fuel element channels.

4. A gas cooled nuclear reactor installation according to claim 3, wherein the moderator cooling channels are convergent in stepped manner in the direction of coolant flow through them.

* * * * *